(12) United States Patent
Wei et al.

(10) Patent No.: US 6,972,147 B1
(45) Date of Patent: Dec. 6, 2005

(54) FLUORESCENT POLYMERIC ARTICLES FABRICATED FROM U.V. LIGHT ABSORBING POLYMER

(75) Inventors: Guang-Xue Wei, Northbrook, IL (US); Drew J. Buoni, Chicago, IL (US); Kimberly A. Dockus, Bloomingdale, IL (US)

(73) Assignee: Avery Dennison Corporation, Pasadena, CA (US)

(*) Notice: Subject to any disclaimer, the term of this patent is extended or adjusted under 35 U.S.C. 154(b) by 147 days.

(21) Appl. No.: 09/710,510

(22) Filed: Nov. 9, 2000

Related U.S. Application Data (60) Provisional application No. 60/247,438, filed on Nov. 9, 2000, provisional application No. 60/247,439, filed on Nov. 9, 2000.

(51) Int. Cl.$^7$ ............... C08F 263/02; B32B 25/08; B32B 25/14; B32B 27/28; B32B 27/16
(52) U.S. Cl. ............... 428/141; 428/40.7; 428/690; 428/917; 430/56; 430/60; 430/68; 430/75; 525/92 E; 525/89; 525/277; 525/301; 525/307; 525/451; 525/461; 525/462; 525/466
(58) Field of Search ............... 528/112, 115, 116, 528/176, 191, 192, 196, 205; 525/242, 277, 525/280, 301, 307, 92 E, 451, 461, 462, 466; 428/690, 917, 141, 40.7; 430/56, 60, 68, 430/75

(56) References Cited

U.S. PATENT DOCUMENTS

| | | |
|---|---|---|
| 2,999,835 A | 9/1961 | Goldberg |
| 3,028,365 A | 4/1962 | Schnell et al. |
| 3,153,008 A | 10/1964 | Fox |
| 3,945,967 A | 3/1976 | Jaquiss |
| 4,025,159 A | 5/1977 | McGrath |
| 4,115,386 A | 9/1978 | Gall et al. |
| 4,230,858 A | 10/1980 | Gall et al. |
| 4,259,458 A | 3/1981 | Robeson |
| 4,286,075 A | 8/1981 | Robeson et al. |
| 4,286,094 A | 8/1981 | Hoch et al. |
| 4,374,239 A | 2/1983 | Berger et al. |
| 4,486,363 A | 12/1984 | Pricone et al. |
| 4,505,967 A | 3/1985 | Bailey |
| 4,598,130 A | 7/1986 | Robeson et al. |
| 4,601,861 A | 7/1986 | Pricone et al. |
| 4,618,518 A | 10/1986 | Pricone et al. |
| 4,643,937 A | 2/1987 | Dickinson et al. |
| 4,672,089 A | 6/1987 | Pricone et al. |
| 4,937,287 A | 6/1990 | Dean |

(Continued)

FOREIGN PATENT DOCUMENTS

JP 63165914 7/1988

(Continued)

OTHER PUBLICATIONS

Claims 1-64 of co-pending U.S. Appl. No.-09/710,560, now US Patent 6,514,594.*

(Continued)

*Primary Examiner*—Duc Truong
(74) *Attorney, Agent, or Firm*—Renner, Otto, Boisselle & Sklar, LLP (57) ABSTRACT

A fluorescent article is disclosed comprising a polymer matrix comprising a polymer having in its backbone repeating units of a U.V. light absorbing moiety, or a moiety capable of being transformed by photo-Fries rearrangement into a U.V. light absorbing moiety, the matrix further comprising a fluorescent dye. The matrix affords surprisingly improved fluorescence protection as compared to prior fluorescent articles having only U.V. light absorbing additives.

33 Claims, 2 Drawing Sheets

U.S. PATENT DOCUMENTS

| | | |
|---|---|---|
| 5,034,502 A | 7/1991 | Hirose et al. |
| 5,124,413 A | 6/1992 | Luise |
| 5,156,863 A | 10/1992 | Pricone et al. |
| 5,316,838 A | 5/1994 | Crandall et al. |
| 5,387,458 A | 2/1995 | Pavelka et al. |
| 5,470,502 A | 11/1995 | Hahn et al. |
| 5,605,761 A | 2/1997 | Burns et al. |
| 5,672,643 A | 9/1997 | Burns et al. |
| 5,674,622 A | 10/1997 | Burns et al. |
| 5,710,197 A | 1/1998 | Fischer et al. |
| 5,736,596 A | 4/1998 | Heitz et al. |
| 5,754,337 A | 5/1998 | Burns et al. |
| 5,808,073 A | 9/1998 | Böhm et al. |
| 5,920,429 A | 7/1999 | Burns et al. |
| 5,942,585 A | 8/1999 | Scott et al. |
| 6,001,936 A | 12/1999 | Barrera et al. |
| 6,005,059 A | 12/1999 | Scott et al. |
| 6,011,124 A | 1/2000 | Scott et al. |
| 6,037,424 A | 3/2000 | Scott et al. |
| 6,043,322 A | 3/2000 | Scott et al. |
| 6,103,796 A | 8/2000 | Staniek et al. |
| 6,110,566 A | 8/2000 | White et al. |

FOREIGN PATENT DOCUMENTS

| | | |
|---|---|---|
| JP | 216042 | 2/1990 |
| WO | WO 9803577 | 1/1998 |
| WO | WO 9920688 | 4/1999 |
| WO | WO 9921937 | 5/1999 |
| WO | WO 9948961 | 9/1999 |
| WO | WO 0026275 | 5/2000 |

OTHER PUBLICATIONS

Yan et al., "Thermal and Photo Stability of Polyarylates—Styrylpyridine-Based Polymers," *Reactive Oligomers*, ACS Symposium Series, 187th Meeting of the American Chemical Society, St. Louis, MO Apr. 8-13, 1984.

Two page brochure on polyarylate made by Westlake Plastics Company, Lenni, PA.

Westlake Product Bulletin on "Ardel (polyarylate)" of Westlake Plastics Company, Lenni, PA.

Two page articles on Polyarylate, Chapter 28, Plastics Design Library.

C.T. Wright et al., "Gas sorption and transport in UV-irradiated polyarylate copolymers based on tetramethyl bisphenol-A and dihydroxybenzophenone," *Journal of Membrane Science* 124 (1997), pp. 161-174.

Technical & Molding Catalogue of U-POLYMER, Unitika America Corp, Japan.

D.L. Love, "How Polyarylates Resist Weathering," *Modern Plastics*, Mar. 1984, pp 60-62.

Robeson et al., "History of Polyarylates," *High performance Polymers: Their Origin and Development*, p. 95-103.

* cited by examiner

FLUORESCENT POLYMERIC ARTICLES FABRICATED FROM U.V. LIGHT ABSORBING POLYMER

CROSS-REFERENCE TO CO-PENDING APPLICATIONS

Reference is made to the following applications, each of which is co-pending with the instant application: U.S. Provisional Application Ser. No. 60/247,438, filed Nov. 9, 2000; U.S. Provisional Application Ser. No. 60/247,439, filed Nov. 9, 2000; U.S. Ser. No. 09/710,560, filed Nov. 9, 2000; and U.S. Ser. No. 09/709,921, filed Nov. 10, 2000.

FIELD OF THE INVENTION

The present invention relates generally to fluorescent polymeric articles comprising one or more fluorescent dyes sensitive to ultraviolet light. More particularly, the invention is directed to U.V. light resistant fluorescent polymeric articles fabricated from a fluorescent colorant and a polymeric resin comprising a U.V. light absorbing polymer, or a polymer capable of rearrangement to a U.V. light absorbing polymer upon exposure to light. The articles of the present invention, preferably polymeric sheeting materials comprising a plurality of retroreflective elements, are stabilized against ultraviolet light degradation without need for placement of a separate U.V. screening layer over the article.

BACKGROUND OF THE INVENTION

Retroreflective sheeting is widely used for traffic and roadway safety signs. Such sheeting is typically provided as a polymeric monolayer or multilayer sheeting material having thousands of retroreflective elements, such as microprismatic corner cubes or glass microspheres that reflect incident light. It is well known to incorporate one or more fluorescent dyes into a retroreflective sheeting material in order to enhance the visibility of articles such as road signs manufactured from such sheeting material. Fluorescent colors enhance visual contrast, which makes fluorescent colored materials more conspicuous than nonfluorescent materials. Unfortunately, most fluorescent colorants have poor ultraviolet light stability. In some cases, fading of fluorescent sheeting due to ultraviolet light exposure can occur within six months. The loss of fluorescence caused by ultraviolet light exposure dramatically shortens the useful life of fluorescent traffic and roadway signs. Accordingly, there is a need in the art to stabilize fluorescent colorants in plastics and to find a means to reduce the fading of fluorescent dyes in order to provide retroreflective road signs that can remain in service for significantly longer periods.

To enhance the outdoor durability of fluorescent retroreflective sheeting, an ultraviolet screening layer is often used to protect the base fluorescent polymeric matrix layer from the effects of ultraviolet radiation. Traditionally, the U.V. light screening layer is made by dissolving U.V. light absorbing compounds into a transparent polymer matrix. Japan Kokai No. 2-16042, Application No. 63-165914 (Koshiji) and U.S. Pat. No. 5,387,458 (Pavelka et al.) each disclose fluorescent articles consisting of an ultraviolet light screen layer disposed in front of a fluorescent color layer. According to these references, the screening layer contains substantial amounts of ultraviolet light absorbing compounds, which absorb a defined range of U.V. light (wavelength from 290 to 400 nm).

Such prior art multilayer structures in which a U.V. light absorbent additive-treated screening layer is disposed in front of a layer containing a fluorescent dye can give rise to several difficulties. One problem is that the U.V. light absorbent additives incorporated into the U.V. light screening layer may leach out with time, because most U.V. light absorbing compounds are relatively small molecules and the U.V. light screening layer is typically quite thin. As a result of this phenomenon, the screening layer may lose its protective function, and the fluorescent colorants in the fluorescent layer will quickly fade and lose their fluorescence when exposed to ultraviolet light. A further problem with the U.V. light absorbent additive-treated screening layers is that U.V. light absorbing compounds present therein can diffuse or migrate into the fluorescent layer. If the U.V. light absorbing compound is not carefully selected, this diffusion can actually accelerate the fading of the fluorescent colorant even though the diffused compound is one that absorbs U.V. light. The problem of additive migration requires that a U.V. light absorbing additive incorporated into a screening layer be carefully matched to the fluorescent colorant so as to minimize any tendency of the migrating U.V. absorber to affect the color and fluorescence of the article. The implication that one may randomly select any U.V. absorber capable of blocking most U.V. light below 400 nm wavelength (see, e.g., Japan Kokai No. 2-16042, Application No. 63-165914 (Koshiji et al.) and U.S. Pat. No. 5,387,458 (Pavelka et al.)) fails to take into account the potential interaction between the U.V. absorber in the screening layer, and the fluorescent dye(s) present in the colored layer.

The use of a multi-layer polymeric structure also presents difficulties in manufacturing. Multiple films must be extruded, cast, or purchased, and the individual films must be laminated together, resulting in a more expensive and more time-consuming process. Moreover, technical problems can arise. For example, the different resins in a multilayer structure must be capable of being bonded to one another. Where the multi-layer article is a retroreflective sheeting structure and the refractive indices of contacting layers are different, the interface between the layers must be delicately controlled and remain optically smooth in order to maximize the retroreflectivity of the resultant articles.

Based on the problems described above, there is a strong need in the art for fluorescent polymeric articles which exhibit improved fluorescence durability against ultraviolet radiation without the need for placement of a separate U.V. light screening layer over the article.

In view of the foregoing, a general object of the present invention is to provide a polymeric article having durable fluorescence in the absence of a separate U.V. light screening layer. Another object of the invention is to provide retroreflective sheeting material having durable fluorescence and being suitable for use in the fabrication of outdoor-weatherable products such as road signs, where the sheeting material is less susceptible to degradation from U.V. light and the rapid loss of fluorescence resulting therefrom.

Yet another object of the invention is to provide a fluorescent polymeric article in which a U.V. light-absorbing polymer, or polymer capable of re-arrangement to a U.V. light absorbing polymer, can provide improved fluorescence stability in comparison to non-U.V. light absorbent polymers treated with U.V. light absorbing additives and/or light stabilizers.

These and other objects will become apparent hereinafter to those skilled in the art.

SUMMARY OF THE INVENTION

The present invention results from our discovery that a polymeric article fabricated from a U.V. light absorbing polymer, and/or a polymer capable of undergoing rearrangement to a U.V. light absorbing polymer, a fluorescent dye, and optional additives such as U.V. absorbing compounds and hindered amine light stabilizers can provide a surprising degree of durability to the resulting fluorescent color. The level of durability is superior to that afforded when a fluorescent polymeric article is fabricated from a non-U.V. light absorbent polymer treated with conventional U.V. light absorbing additives (e.g., benzophenones and/or benzotriazoles, either with or without hindered amine light stabilizers, and the like). Although U.V. light absorbing resins have been known (e.g., polyarylates), it could not have been predicted that the use of such resins as a host matrix for a fluorescent dye would afford such a surprising degree of fluorescent durability without the use of an additional U.V. light screening layer.

Accordingly, we have found that the objects stated above can be achieved in a U.V. light-resistant polymeric article comprising a fluorescent dye and at least one U.V. light absorbing polymer, or a polymer that can undergo photo-Fries re-arrangement to a U.V. light absorbing polymer. More particularly the polymeric resin used to fabricate the fluorescent article comprises at least one polymer, or a mixture thereof, selected from the group consisting of:

(i) polymers having a polymeric backbone comprising the following repeating moiety A;

A wherein R is a non-interfering substituent and P is the remainder of the polymer, and whereby the polymers are able to absorb ultraviolet light; and (ii) polymers having a polymeric backbone comprising the following repeating moiety B:

B where R is a noninterfering substituent and P is the remainder of the polymer; said moiety B being transformable to said moiety A by photo-Fries rearrangement, whereby said polymers comprising moiety B can undergo rearrangement to ultraviolet-absorbing polymers comprising moiety A;

whereby said fluorescent colorant is stabilized against ultraviolet radiation without placement of a separate U.V. light screening layer over said article.

The term "non-interfering substituent" is intended to denote substituents which do not prevent the above-defined moieties from exhibiting U.V. light absorbent properties, or from undergoing photo-Fries rearrangement to U.V. light absorbing moieties.

The U.V. resistant article of the present invention may also comprise a mixture of the moiety A and moiety B polymers. Without intending to be bound to any particular theory, the enhanced color and fluorescence durability provided in the articles of the present invention are believed to result, at least in part, from the repeating U.V. light absorbing moieties being present directly in the backbone of the host matrix polymer, as distinguished from separate U.V. light absorbing compounds admixed with polymer.

The invention is further directed to a retroreflective sheeting material comprising a fluorescent dye in a polymeric resin matrix comprising polyarylate, and a plurality of retroreflective elements; said fluorescent dye being stabilized at least in part by said polyarylate resin matrix against ultraviolet deterioration in the absence of a separate U.V. light screening layer disposed over the sheeting material.

In a further aspect, the invention is directed to a fluorescence-stabilized polymeric retroreflective road sign comprising: a polymeric sheeting material, said sheeting material comprising a fluorescent dye, a polyarylate resin, and a plurality of retroreflective elements, and without a separate U.V. screening layer over the sheeting material.

Preferred polymers for the sheeting material of the present invention include polyarylate, and blends of polyarylate with any one or more of the following: polycarbonate, poly(ethylene terephthalate) ("PET"), poly(cyclohexanedimethanol terephthalate) ("PCT") and/or poly(cyclohexanedimethanol-co-ethylene terephthalate ("PETG"). Although the polyarylate backbone contains a moiety B capable of undergoing photo-Fries rearrangement to a benzophenone-type U.V. light absorbing moiety, the invention is also directed to polymers which have benzophenone-type moieties (see moiety A above) in their polymeric backbone and thus do not require rearrangement to become U.V. light absorbent. Surprisingly, we have found that fluorescent polymeric sheeting materials fabricated from blends of polyarylate with either poly(ethylene terephthalate) or polycarbonate afford greater fluorescence stabilization than such fluorescent polymeric sheeting materials fabricated entirely from polyarylate. We have also discovered that the fluorescent stabilization exhibited by the sheeting materials of the present invention may be enhanced by the addition of U.V. light absorbing additives such as benzophenones and/or benzotriazoles, either with or without hindered amine light stabilizers (HALS), and preferably a combination of a U.V. light absorbing (e.g., a benzotriazole compound) and HALS.

Numerous advantages are provided by the invention. For example, the U.V. resistant sheeting material of the present invention will provide excellent fluorescence protection to virtually any fluorescent colorant. Another advantage is that problems associated with leaching out or migration of U.V. light absorbing additives are eliminated. The manufacturing difficulties associated with applying a separate U.V. light absorbing screening layer are also eliminated. Yet another advantage of the invention is that in a preferred embodiment in which polyarylate (and preferably a blend thereof with polycarbonate or poly(ethylene terephthalate)) is present as the U.V. light absorbent polymer in the U.V. resistant sheeting material hereof, the sheeting material is afforded a combination of excellent properties important in the fabrication of durable retroreflective sheeting material such as toughness, impact resistance, and chemical resistance.

DETAILED DESCRIPTION

For purposes of this patent, U.V. light absorbing polymer materials are defined as polymer materials that absorb some quantity of light for at least some wavelengths between about 290–410 nm.

The heart of the invention lies in the use of a U.V. light absorbing polymer, preferably polyarylate, as a component of the polymeric matrix for a sheeting material containing a fluorescent colorant. When exposed to light, polyarylate converts to a polymer having in its backbone hydroxybenzophenone-like moieties which absorb U.V. light. We find that the use of a U.V. light absorbing polymer, such as polyarylate, having U.V. absorbing moieties incorporated in the polymeric backbone, or moieties capable of undergoing photo-Fries rearrangement in situ to U.V. light absorbent moieties, provides much better and longer U.V. protection than that afforded by merely adding conventional U.V. additives such as hydroxybenzophenones to a non-U.V. absorbent polymer. This is quite surprising insofar as the U.V. light absorbing moieties that form segments of the backbone of the polymers used in the invention (hydroxybenzophenone-type moieties, see moiety A, above) are similar to those present in conventional benzophenone U.V. light absorbing additives of the prior art.

In somewhat greater detail, the polymer suitable for fabricating the U.V. light resistant fluorescent sheeting material can comprise any polymer in which the polymeric backbone either comprises the repeating ultraviolet light absorbing o-hydroxybenzophenone moiety A, below:

or a repeating moiety capable of undergoing re-arrangement to the above moiety. An example of such a repeating moiety is moiety B below:

An example of a particularly preferred class of polymers for use in the articles of the present invention containing repeating B moieties (and/or repeating A moieties following photo-Fries rearrangement) are the so-called polyarylates.

Generally speaking, polyarylates are very well known in the art and are obtained by polymerization of a diphenol and a dicarboxylic acid. Polyarylates suitable for use in the articles of the instant invention include those described in U.S. Pat. No. 4,598,130, incorporated herein by reference. As described in U.S. Pat. No. 4,598,130, and for purposes of illustration and not by way of limitation, suitable dihydric phenols that can be employed to prepare the polyarylates are bisphenols such as bis(4-hydroxyphenyl)methane, 2,2-bis (4-hydroxyphenyl)propane(bisphenol-A), 2,2-bis(4-hydroxy-3-methylphenyl)propane, 4,4-bis(4-hydroxyphenyl) heptane, 2,2-bis(4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3, 5-dichloro-4-hydroxyphenyl)ether, etc.; dihydroxydiphenyls such as p,p'-dihydroxydiphenyl, 3,3'-dichloro-4,4' -dihydroxydiphenyl, etc.; dihydroxyaryl sulfones such as bis(4-hydroxyphenyl)sulfone, bis(3,5-dimethyl-4-hydroxyphenyl)sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfoxides such as bis(4-hydroxyphenyl)sulfoxide, bis(3,5-dibromo-4-hydroxyphenyl)sulfoxide, etc. A variety of additional dihydric phenols are also available such as are disclosed in U.S. Pat. Nos. 2,999,835; 3,028,365 and 3,153,008. Also suitable are copolymers prepared from the above dihydric phenols copolymerized with halogen-containing dihydric phenols such as 2,2-bis(3,5-dichloro-4-hydroxyphenyl)propane, 2,2-bis(3,5-dibromo-4-hydroxyphenyl)propane, etc. It is also possible to employ two or more different dihydric phenols or a copolymer of a dihydric phenol with a glycol or with hydroxy or acid terminated polyester, or with a dibasic acid as well as blends of any of the above materials. Suitable dicarboxylic acids are the aromatic and aliphatic aromatic dicarboxylic acids such as phthalic, isophthalic, terephthalic, o-phthalic, o-, m-, and p-phenylenediacetic acid; the polynuclear aromatic acids such as diphenic acid, and 1,4-naphthalic acid.

One of the most widely used commercial polyarylates results from the polymerization of bisphenol A (2,2-bis-(4-hydroxyphenyl)propane) and a 50:50 mixture iso/terephthalic acids. This polyarylate, which is particularly preferred for use in the sheeting material of the present invention, was previously commercially available under the tradename "Ardel D100" from Amoco Performance Polymers, Inc. and is now sold by Unitika America Corporation and its distributors under the tradename "U-Polymer U-100". The preferred polyarylate used in the present invention has the following formulas I and II below. Formula I is the polyarylate prior to photo-Fries rearrangement. Formula II is the polyarylate following photo-Fries rearrangement. One or both polymers may be present in the sheeting material:

Another suitable group of polyarylates are those based on tetramethyl bisphenol-A, 4,4'-dihydroxybenzophenone, and 5-tertiary-butyl isophthalic acid dichloride, as generally disclosed in Wright, et al., *Journal of Membrane Science*, vol. 124, pp. 161–174 (1997), and other polyarylate structures disclosed therein.

A discussion of the structure and preparation of polyarylates may be found in the chapter entitled "History of Polyarylates" by L. Robeson and J. Tibbet (at page 95 of the treatise *High Performance Polymers: Their Origin and Development*, E. B. Seymour and G. S. Kirshenbaum, editors (1986)). Known processes for the production of a polyarylate include, for example, interfacial polymerization by mixing a solution of an aromatic dicarboxylic acid dihalide in an organic solvent with an alkaline aqueous solution of a bisphenol under stirring to react these materials; solution polymerization by reacting an aromatic dicarboxylic acid dihalide with a bisphenol in the presence of a deacidifying agent such as pyridine in an organic solvent; molten polymerization by reacting an aromatic dicarboxylic acid diphenyl ester with a bisphenol; molten polymerization by reacting an aromatic dicarboxylic acid, diphenyl carbonate and a bisphenol; molten polymerization by reacting an aromatic dicarboxylic acid with a bisphenol diacetate; and polymerization by reacting an aromatic dicarboxylic acid with a bisphenol diacetate. Methods for preparation of polyarylates may be referenced in further detail in Hirose, et al. U.S. Pat. No. 5,034,502 and Berger et al. U.S. Pat. No. 4,374,239, both incorporated herein by reference.

It is well known that, upon exposure to ultraviolet light, polyarylates undergo the photo-Fries rearrangement. See, Korshak et al., in "Synthesis and Properties of Self-Protecting Polyarylates," *Journal of Polymer Science*, Part A-1, Vol. 7, pages 157 to 172 (1969), which describes a mechanism to explain what happens when polyarylates are exposed to U.V. light. The authors propose that polyarylates undergo the photo-Fries rearrangement resulting in carbonyl and hydroxyl groups ortho to one another, structurally similar to o-hydroxybenzophenones which are known light absorbers. The o-hydroxybenzophenones which are part of the polyarylate polymer backbone can absorb greater than 95% U.V. light at wavelengths below 375 nm, and substantial amounts of U.V. light between 375 and 410 nm wavelength light. We have now found that when these moieties are within the polymeric backbone of the fluorescent layer, they provide greater durability for those fluorescent colorants than when the benzophenones are present merely as additives to the polymeric resin matrix.

It should be understood that while the above described polyarylate is a preferred U.V. light absorbing polymer for use in articles of the present invention, any polymer which contains moiety A or B, above, is contemplated for use in the invention provided the polymer has properties which make it suitable for use in the particular product application under consideration. A further example of such a polymer is the block copolyestercarbonates described in International Patent Application WO 00/26275 (published May 11, 2000), incorporated by reference herein. The copolyestercarbonates described in the '275 application comprise organic carbonate blocks alternating with arylate blocks, where the arylate blocks are derived from a 1,3-dihydroxybenzene moiety and an aromatic dicarboxylic acid. Specifically the block copolyestercarbonate polymer having a moiety A and/or a moiety B as defined above has one or both of the structures (III) and (IV) below, respectively:

wherein each $R^1$ is independently H or $C_1$–$C_{12}$ alkyl, p is 0–3, each $R^2$ is independently a divalent organic radical; m is at least 1, and preferably about 2–200; and n is at least about 4, and preferably about 30–150.

The applicant in the above mentioned '275 application posits that the weatherability of the above copolyestercarbonates is attributable, at least in part, to the occurrence of thermally or photochemically induced photo-Fries rearrangement of arylate blocks (see structure IV above) to yield o-hydroxybenzophenone moieties (see structure III above) or analogs thereof which serve as absorbers of U.V. radiation.

Additional polymers capable of undergoing rearrangement to U.V. light absorbent polymers are described in Cohen et al in "Transparent Ultraviolet-Barrier Coatings," *Journal of Polymer Science*, Part A-1, Vol. 9, pages 3263 to 3299 (1971) (incorporated by reference) which describes a number of phenyl polyesters, including polyarylates, which were synthesized to furnish molecules whose backbones rearrange under U.V. light to an o-hydroxybenzophenone structure.

The U.V. absorbing properties of the U.V. absorbing polymer need not result from a photo-Fries rearrangement. For example, as explained in the above-mentioned '275 application, synthesis and polymerization of suitable hydroxybenzophenone type monomers can result in polymers in which the U.V. light absorbing moiety A (see above) is already present in the polymer without need for the polymer to undergo photo-Fries rearrangement.

It should be understood that in the case where a polyarylate is used in the present invention, the U.V. light absorbing properties of the polyarylate will take some time to "develop" in the presence of U.V. radiation, with the time for "development" depending upon the environment and the intensity of the U.V. radiation. For example, in a Xenon Arc Weather-O-Meter, polyarylate typically takes about 50 hours to "develop." In view of this "development" period, it may be desired, although not required, to include a small quantity of U.V. light absorbing compounds or light stabilizers in or in front of the fluorescent layer to provide some initial protection in the period before the U.V. light absorbing polymer has acquired its full protective capability.

While the polymeric resin used to fabricate a U.V. light resistant fluorescent article may consist entirely of the U.V. absorbing polymers described above containing a moiety A and/or B, it is also contemplated herein to use blends of the U.V. absorbing polymer with other suitable polymers that may or may not have a U.V. absorbing moiety in the polymeric backbone. For example, blends of polyarylate with polymers selected from the group consisting of poly(ethylene terephthalate) ("PET"); poly(cyclohexanedimethanol-co-ethylene terephthalate) ("PETG"); polycarbonate; and poly(cyclohexanedimethanol terephthalate) ("PCT") can be used. Reference may be had to Robeson et al. U.S. Pat. Nos. 4,286,075 and 4,259,458 (incorporated herein by reference) for a more detailed discussion of some of the foregoing polyarylate blends. Particularly preferred are blends of polyarylate and either polycarbonate or poly(ethylene terephthalate).

Methods for fabricating thermoplastic sheets from polyarylate and polyarylate blends, and for laminating these sheets to other polymeric layers are well known in the art. See for example Robeson et al. U.S. Pat. No. 4,643,937. The polymeric films which are used within this process may be fabricated in a known manner, for example using an extrusion methodology.

Preferably, the U.V. resistant sheeting material of the present invention is provided with a plurality of microprism retroreflective elements which may be formed directly onto a surface of the sheeting material in a known manner. For example, Pricone et al. U.S. Pat. No. 4,601,861 discloses an improved method and apparatus for continuously embossing a repeating pattern of precise detail, in particular, cube-corner type retroreflector elements, on one surface of a single sheet or on one surface of a laminate of transparent thermoplastic materials, to form retroreflective sheeting. Pricone et al. discloses a continuous embossing tool in the form of a flexible thin metal belt or cylinder having on its outer surface an embossing pattern which is the reverse of the precision optical pattern to be formed. The embossing tool is continuously moved at a predetermined speed along a closed course through a heating station where the temperature of a portion of the embossing tool is raised above the glass transition temperature of the sheeting or laminate, and a cooling station where the heated portion of the embossing tool is cooled, while in a relatively planar condition, to below that glass transition temperature. The sheeting is continuously moved at the predetermined speed from a supply thereof into engagement with the embossing pattern on the tool and is pressed thereagainst continuously at a plurality of pressure points sequentially spaced along the heating station, with the one surface of the sheeting confronting and engaging the embossing pattern until the sheeting is raised above its glass transition temperature and conforms to the embossing pattern on the one face. The sheeting is maintained in engagement with the tool until the tool passes through the cooling station and the sheeting is lowered below its glass transition temperature and the pattern solidifies. The sheeting thereafter is stripped from the tool. Further details of the foregoing methodology are described in Pricone et al. which is incorporated herein by reference.

It is well known that many colorants, particularly fluorescent colorants, are highly susceptible to U.V. degradation. The fluorescent article of the present invention, insofar as it provides a remarkably stable environment against U.V. weathering, contemplates incorporation of one or more U.V. sensitive fluorescent colorants/dyes or combination thereof, including known such dyes and dye combinations. The invention is not limited to any particular dye or colorant. Examples of suitable dyes are any of the fluorescent dyes which are known in the art for enhanced daytime and nighttime visibility of road signs. Examples of such dyes are the perylene, perylene imide, perylene ester, thioxanthene, thioxanthone, and thioindigoid compounds. Other dyes that may be suitable include the benzoxanthene, benzothiazine, napthalimide, and coumarin compounds. Blends of the foregoing dyes are also contemplated. As will be apparent to those skilled in the art, when the instant invention is embodied in the form of retroreflective sheeting, the dyes used will be sufficiently transparent such that the retroreflective function of the sheeting will not be significantly impaired.

Further examples of specific fluorescent dyes suitable for incorporation into fluorescent articles of the invention include the perylene ester and perylene imide dyes such as Lumogen F Orange 240, Lumogen F Yellow 083, and Lumogen F Red 300 (all available from BASF, Rensselaer, N.Y.); thioxanthene dyes, such as Hostasol Yellow 3G Solvent Yellow 98 (available from Clariant Corporation, Charlotte, N.C.) and Marigold Orange D-315 (Day-Glo Color Corporation, Cleveland, Ohio); thioxanthone dyes such as Hostasol Red GG (Clariant); thioindigoid dyes such as Hostasol Red 5B (Clariant); coumarin based dyes such as Macrolex 10 GN (Bayer Corporation) and Potomac Yellow D-838 (Day-Glo); benzoxanthene dyes such as Lumofast Yellow 3G (Day-Glo); and benzothiazine dyes such as Huron Yellow D417 (Day-Glo).

In addition to the fluorescent dyes, non-fluorescent colorants may also be used to adjust the color of the final product.

The amount of fluorescent dye used in the fluorescent article of the invention is dependent upon the type of dye, typically in the range of about 0.05 to about 1.5 percent, preferably in the range of 0.08 to 1.0 percent based on the total weight of the resin formulation used to fabricate a fluorescent article such as fluorescent sheeting material. In some cases, the loading of fluorescent dyes depends on the gauge of the fluorescent layer of the sheeting material and can be determined in accordance with the skill in the art.

To further enhance the fluorescent durability of articles of the invention, the fluorescent layer of the invention may optionally contain any of the well known ultraviolet absorbers (UVA's) and hindered amine light stabilizers (HALS); such UVA's and HALS also could be included in an optional cap layer or over-laminate layer. The present invention, however, makes it possible to substantially reduce or eliminate such additives, in either the fluorescent layer or in a cap layer or over-laminate.

Examples of U.V. light absorbers suitable for use in articles of the instant invention include the benzophenones, benzotriazoles, and oxalanilides. Examples of commercially available benzophenones include 2-hydroxy-4-n-octoxybenzophenone commercially available from Great Lakes Chemical Corporation under the trade name "Lowilite 22," 2,2-dihydroxy-4,4-dimethoxybenzophenone available under the trade name "Uvinul 3049" from BASF; and 2,2',2,4'-tetrahydroxybenzophenone available under the trade name "Uvinul 3050" from BASF. Examples of suitable benzotriazoles include 2-(2H-benzotriazol-2-yl)-4,6-bis(1-methyl-1-phenylethyl)phenol, sold under the trade name "Tinuvin 234" by Ciba-Geigy; and 2-(4,6-diphenyl-1,3,5-triazine-2-yl)-5(hexyl)oxyphenol sold commercially by Ciba-Geigy as "Tinuvin 1577". An example of an oxalanilide U.V. absorber is 2-ethyl,2'-ethoxy-oxalanilide sold under the trade name "Sanduvor VSU" by Clariant. Individuals skilled in the art will recognize that many other suitable benzophenone, benzotriazole, and oxalanilide U.V. light absorbers exist and may be suitable for use in the present invention.

The amount of U.V. light absorber suitable for use in the fluorescent layer of the invention is in the range of about 0.2 to about 4 percent, and preferably in the range of about 0.3 to about 2.0 percent based on the total weight of the fluorescent layer.

We believe it may be advantageous to use oligomeric and/or polymeric HALS in the present invention either alone or in conjunction with U.V. light absorbers. Examples of suitable HALS include: dimethyl succinate polymer with 4-hydroxy-2,2,6,6-tetramethyl-1-piperidineethanol commercially available from Ciba Specialty Additives as "Tinuvin 622"; poly[[6-[(1,1,3,3,-tetramethyl butyl)amino]-s-triazine-2,4-diyl][[(2,2,6,6,-tetramethyl-4-piperidyl)imino]hexamethylene[(2,2,6,6-tetramethyl-4-piperidyl)imino]] commercially available from Ciba Specialty Additives under the trade name Chimassorb 944; "Tinuvin 791" which is available from Ciba Specialty Additives and is a blend of poly[[6-[1,1,3,3,-tetramethyl butyl)amino]-s-triazine-2,4-diyl][[(2,2,6,6,-tetramethyl-4-piperidyl)imino]hexamethylene[ (2,2,6,6-tetramethyl-4-piperidyl)]imino]] and bis(2,2,6, 6-tetramethyl-4-piperidynyl)sebacate; and "Hostavin N30" available from Clariant. Those skilled in the art will recognize that many other hindered amine light stabilizers may be used in the present invention.

The amount of HALS suitable for use in the fluorescent layer of the invention is in the range of about 0.2 to about 2 percent, and preferably in the range of about 0.3 to about 1.0 percent based on the total weight of the fluorescent layer formulation.

Figure 2:
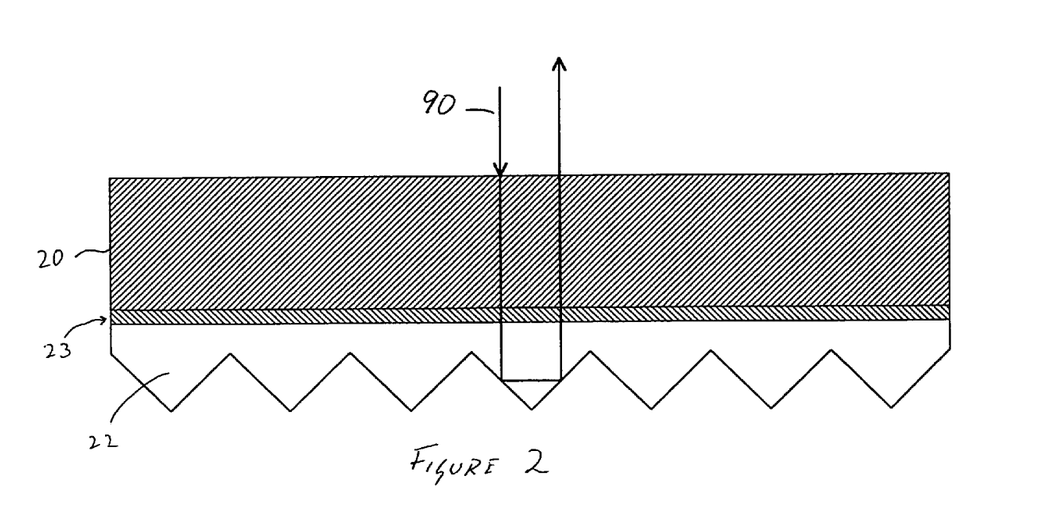
FIG. 2 illustrates a cross-section view of a microprismatic retroreflective sheeting material of the invention comprising a layer of a U.V. light absorbent polymer matrix having a fluorescent colorant blended therein, a colorless retroreflective layer, and an optional tie layer or adhesive therebetween, and wherein the retroreflective microprismatic cube corner elements are formed onto the colorless layer.
Figure 3:
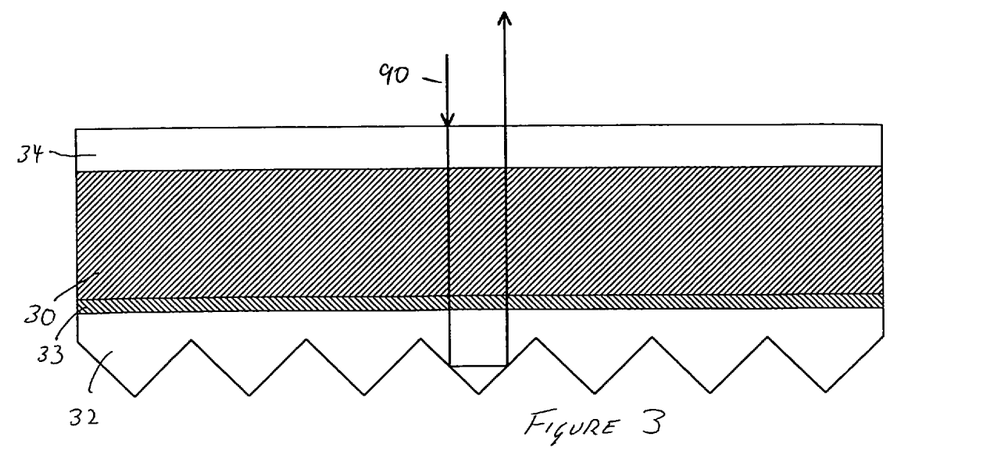
FIG. 3 illustrates a cross-section view of a microprismatic retroreflective sheeting material of the invention comprising a cap or over-laminate layer having desired properties, a layer of a U.V. absorbent polymer matrix having a fluorescent colorant blended therein, a colorless retroreflective layer having microprismatic cube corner elements formed thereon, and an optional tie layer or adhesive between the fluorescent and retroreflective layers.
Figure 4:
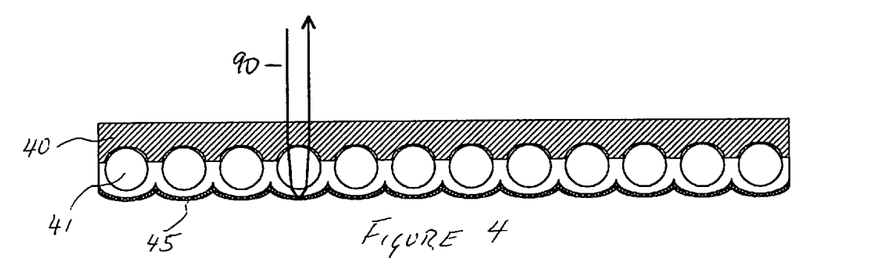
FIG. 4 illustrates a cross-section view of an enclosed lens retroreflective sheeting material of the invention in which the U.V. light absorbing polymeric matrix having a fluorescent colorant blended therein is disposed over an enclosed lens structure.
Figure 5:
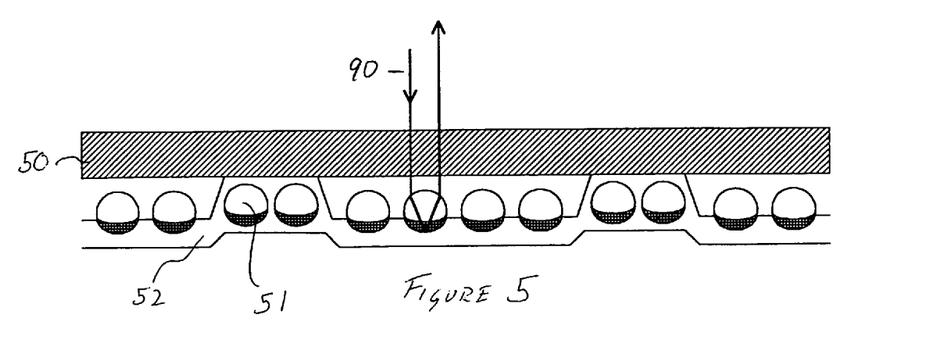
FIG. 5 illustrates a cross-section view of an encapsulated lens retroreflective sheeting material of the invention in which the U.V. light absorbing polymeric matrix having a fluorescent colorant blended therein is disposed over an encapsulated lens structure.

FIGS. 1–5 illustrate different embodiments of fluorescent retroreflective sheeting material in accordance with the instant invention in which a polymer matrix comprises a U.V. light absorbing polymer and a fluorescent colorant blended therein, and in which the retroreflective elements are either microprismatic cube corner elements (FIGS. 1–3) or glass microspheres (FIGS. 4–5).

Figure 1:
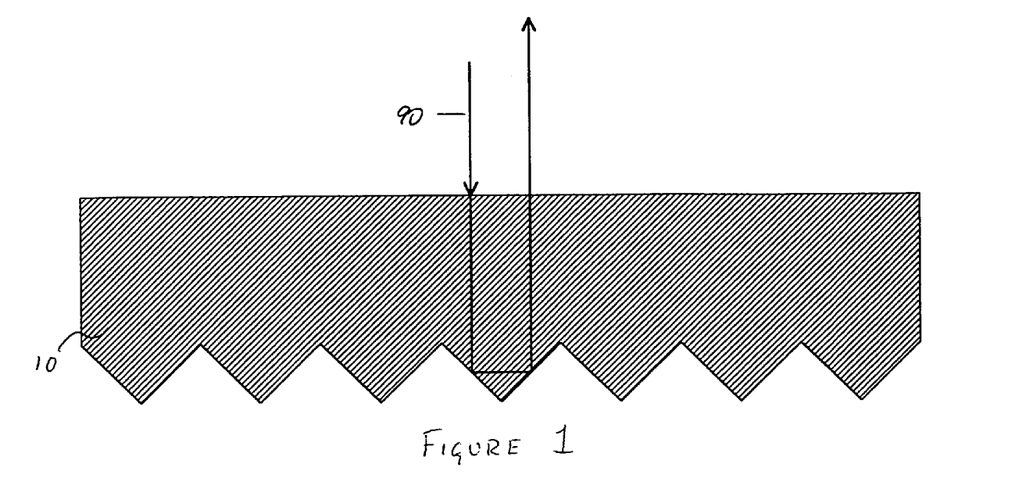
FIG. 1 illustrates a cross-section view of a microprismatic retroreflective sheeting material of the invention comprising a monolayer of a U.V. light absorbing polymer matrix having a fluorescent colorant blended therein, and wherein the retroreflective microprismatic cube corner elements are formed onto a surface of the fluorescent U.V. light absorbing layer.

FIG. 1 illustrates the simplest embodiment of a retroreflective sheeting article made in accordance with the instant invention, which is a monolayer structure having a layer 10 which is a polymer matrix comprising a U.V. light absorbing polymer and a fluorescent colorant blended therein, and having microprismatic retroreflective elements disposed on the rear surface of the layer.

FIG. 2 illustrates an alternative embodiment of a retroreflective sheeting article made in accordance with the instant invention having a layer 20 which is a polymer matrix comprising a U.V. light absorbing polymer and a fluorescent colorant blended therein disposed in laminar configuration over retroreflective layer 22. Such a construction may be desirable when one polymeric material may be preferred for use in the retroreflective layer, such as for its optical properties or its cube geometry retention properties, which may differ from those properties of layer 20. The structure of FIG. 2 allows the sheeting designer to choose materials for each of the layers that will optimize the properties of the entire finished sheeting structure for a particular intended purpose. Optional layer 23 can be either a tie layer or a laminating adhesive disposed between layers 20 and 22.

FIG. 3 illustrates an alternative embodiment of a retroreflective sheeting article made in accordance with the instant invention comprising a layer 30 which is a polymer matrix comprising a U.V. light absorbent polymer and a fluorescent colorant blended therein, disposed in laminar configuration over layer 32 having retroreflective elements disposed on the opposite surface thereof, and a cap layer or over-laminate film 34 disposed in laminar configuration over layer 30. Cap layer or over laminate film 34 may be selected to have properties desirable for the front surface of a sign, such as dew-resistance or ease of printing, which properties may not be optimum in the polymer matrix of layer 30. Optional layer 33 can be either a tie layer or a laminating adhesive disposed between layers 30 and 32.

The embodiments of FIGS. 1–3 are by way of illustration and not by way of limitation. For example, the optional tie layer or laminating adhesive 33 of FIG. 3 also could be used between layers 30 and 34. The cap layer or over-laminate layer of FIG. 3 could find utility in the structure of FIG. 1. Other variations will be apparent to those skilled in the art of retroreflective sheeting.

In another embodiment of the invention, one surface of one of the layers of the multi-layer embodiments can be pre-printed with a desired legend, so that the finished laminar structure has the desired legend on an inner surface thereof, such as disclosed in U.S. Pat. No. 5,213,872 and U.S. Pat. No. 5,310,436, both incorporated herein by reference in their entirety. For example, a layer having a legend pre-printed thereon may be disposed between layers 20 and 22 of FIG. 2, or a legend may be pre-printed on the top or bottom surface of layer 30 or the bottom surface of layer 34 of the embodiment of FIG. 3.

FIG. 4 illustrates how the present invention can be incorporated into an enclosed lens retroreflective sheeting article. Enclosed lens retroreflective sheeting is well-known in the art, having been taught as early as U.S. Pat. No. 2,407,680 (Palmquist) and comprising lenses such as glass microspheres embedded in a sheeting structure with a flat, transparent cover film. In the embodiment in FIG. 4, glass microspheres 41 are embedded in flat transparent cover film 40 comprising a U.V. light absorbing polymer and a fluorescent dye blended therein. Specularly reflective layer 45 may be vacuum deposited aluminum, as is well known in the art.

FIG. 5 illustrates how the present invention can be incorporated into an encapsulated lens retroreflective article. Encapsulated lens sheeting is also well known in the art, having been taught as early as U.S. Pat. No. 3,190,178 (McKenzie). Such sheeting comprises a binder layer in which a monolayer of lenses such as glass microspheres is partially embedded, and further comprises a cover film sealed to the binder layer such that the lenses are encapsulated within hermetically sealed cells. In the embodiment illustrated in FIG. 5, glass microspheres 51 are partially embedded in binder layer 52, and cover film 50 comprises a U.V. light absorbing polymer and a fluorescent dye blended therein.

Multi-layer embodiments of the glass bead sheeting of FIGS. 4, 5, such as are shown for microprismatic sheeting in FIGS. 1–3, will be apparent to those skilled in the art.

The U.V. light resistant article of the present invention is suitable for numerous applications in which the article will be exposed to outdoor weathering conditions.

The following examples are provided for purposes of illustration, only, and are not intended to limit the invention as defined in the appended claims.

EXAMPLES

In each of the following examples, the fluorescent film formulations of the instant invention were of polyarylate (PAL), blends of polyarylate with polycarbonate (PAL/PC), and blends of polyarylate with poly(ethylene terephthalate) (PAL/PET). It will be understood, however, that the fluorescent formulations can be any transparent film containing polyarylate or a polymer with similar molecular structure to polyarylate, and blends thereof, which contain the U.V. light absorbing moieties A and/or B defined above. The polyarylate resin pellets used were "U-Polymer U-100", the PAL/PC blend pellets used were "U-Polymer P-5001", and the PAL/PET blend pellets used were "U-Polymer U-8400H", all available from Unitika, Japan. In comparative sample 1—1, the polycarbonate resin pellets used were Calibre-302 available from Dow Chemical Company. The fluorescent dye used in each sample was Hostasol Yellow 3G available from Clariant, present as 0.25 wt % in each sample. The film formulations were made using a C.W. Brabender Plasti-Corder Prep-Mixer (manufactured by C.W. Brabender Instruments, Inc. of Hackensack, N.J.) through melt mixing of polymer resins and additives, followed by conversion into films of about 6 mils using a heated platen press. The mixing temperatures used were in the range of about 230–300° C. depending on the resins. The Brabender speed was 100 rpm and the mixing time used was in the range of about 3 to 6 minutes. Samples were prepared in 150 gram batches. Any exceptions to this sample preparation method will be noted in the specific examples.

Each sample was placed into a Xenon Arc accelerated "Weather-O-Meter" weathering unit. The test methodology used for the Xenon Arc weathering is outlined in ASTM G26–90, Section 1.3.1. Borosilicate inner and outer filters were used, and the irradiance level was set to 0.35 W/m² at 340 nm. Color measurements were taken routinely on a HunterLab LS-6000 colorimeter using a D65 light source, 2° observer, and a 0/45 geometric configuration. To determine the extent of fading and color shifts, the CIELAB ΔE* color difference was calculated to compare the initial color reading taken prior to accelerated weathering and the color reading after weathering for preselected durations of time. A small value for the CIE ΔE* color difference factor indicates small difference in color. A value of about 2 or 3 is barely detectable to the human eye.

Example 1

This example demonstrates the effectiveness of polyarylate and polyarylate blends as U.V. absorbing polymer matrices for a fluorescent dye relative to polycarbonate, without any U.V. absorbing additives or hindered amine light stabilizers.

TABLE I

Accelerated Weathering Results of Fluorescence in Different Polymer Without UVA's or HALS

| | | ΔE* of Samples Exposed at Noted Period of Time (Hours) | | |
|---|---|---|---|---|
| Sample | Matrix | 500 | 1000 | 1500 |
| 1-1 (comparison) | Polycarbonate | 8.24 | 26.07 | 44.26 |
| 1-2 | Polyarylate | 6.19 | 9.98 | 13.96 |
| 1-3 | PAL/PC | 4.14 | 4.31 | 5.78 |
| 1-4 | PAL/PET | 2.98 | 4.46 | 7.49 |

These results illustrate the effectiveness of polyarylate and polyarylate blends at protecting fluorescent color from U.V. light degradation as compared to polycarbonate. It is particularly surprising that the blends of PAL/PC and PAL/PET have superior fluorescent and color durability compared to pure polyarylate. Sample 1—1 was prepared through extrusion technique on a Killion ¼" single-screw laboratory extruder.

Example 2

Example 2 demonstrates the improved fluorescent durability achieved by addition of a U.V. light absorber to polymeric films containing polyarylate ("PAL") blended with polycarbonate (PC) or polyethylene terephthalate (PET). Samples of PAL/PC and PAL/PET containing fluorescent dye were prepared as described in Example 1, except that the samples also included as a U.V. light absorber a benzotriazole-based compound sold by Ciba under the name Tinuvin 1577. Samples 2-1, 2-2 were loaded at 0.3 wt % and sample 2-3 was loaded at 3.0 wt %. The samples were weathered using the Xenon Arc accelerated Weather-O-Meter for the period noted. The results are shown in Table II.

TABLE II

Accelerated Weathering Results of Fluorescence in PAL Blends with UVA

| | | ΔE* of Samples Exposed at Noted Period of Time (Hours) | | |
|---|---|---|---|---|
| Sample | Matrix | 500 | 1000 | 1500 |
| 2-1 | PAL/PC/0.3% UV abs | 1.65 | 2.18 | 2.94 |
| 2-2 | PAL/PET/0.3% UV abs | 3.49 | 7.86 | 3.66 |
| 2-3 | PAL/PET/3.0% UV abs | 3.87 | 4.85 | 4.31 |

The results in Table II show that the U.V. absorber is effective in providing fluorescent durability in PAL/PC and PAL/PET blends. It is noteworthy that a 10-fold increase in U.V. absorber loading between sample 2-2 and 2-3 did not result in a significant change in ΔE* at 1500 hours of accelerated exposure.

Example 3

This example illustrates the effectiveness of combining a U.V. light absorber and HALS to provide durable fluorescence in PAL/PC and PAL/PET blends. The loading of U.V. light absorber (Tinuvin 1577) and HALS (Tinuvin 791) was 0.3 wt %, each. The results are shown in Table III.

TABLE III

Accelerated Weathering Results of Fluorescence in
PAL Blends with UVA and HALS Additives

| Sample | Matrix | ΔE* of Samples Exposed at Noted Period of Time (Hours) | | |
|---|---|---|---|---|
| | | 500 | 1000 | 1500 |
| 3-1 | PAL/PC/UV/HALS | 2.38 | 2.44 | 3.75 |
| 3-2 | PAL/PET/UV/HALS | 2.71 | 2.60 | 1.58 |

The results demonstrate that the combination of UVA and HALS in PAL/PC and PAL/PET blends is remarkably effective in preventing the degradation of a fluorescent dye.

Example 4

This example illustrates that different HALS compounds in combination with a benzotriazole U.V. light absorbing additive provide increase fluorescent durability of fluorescent dyes in PAL/PET blends in accordance with the instant invention. Three HALS, namely, Tinuvin 791, Tinuvin 622, and Hostavin N30 (available from Clariant), each were blended in a PAL/PET matrix with the benzotriazole Tinuvin 1577 and Hostasol Yellow 3G dye. Each HALS and the UVA Tinuvin 1577 were loaded at 0.3 wt %. The accelerated weathering results are shown in Table IV. (Note that sample 4-2 below is also sample 3-2 in Example 3 above.)

TABLE IV

Accelerated Weathering Results of Fluorescence in
PAL/PET Blends with UVA and Different HALS Compounds

| Sample | Matrix | Type of HALS | ΔE* of Samples Exposed at Noted Period of Time (Hours) | | |
|---|---|---|---|---|---|
| | | | 500 | 1000 | 1500 |
| 4-1 | PAL/PET | T-622 | 2.0 | 4.53 | 5.43 |
| 4-2 | PAL/PET | T-791 | 2.71 | 2.60 | 1.58 |
| 4-3 | PAL/PET | N30 | 3.97 | 5.05 | 3.53 |

The results in Table IV illustrate that different HALS combined with UVA Tinuvin 1577 are effective in increasing the durability of Hostasol Yellow 3G fluorescent dye in PAL/PET blends in accordance with the instant invention.

While the article of the instant invention has been described in terms of a fluorescent retroreflective sheeting material, the invention is not so limited. The instant invention is intended to encompass any fluorescent article that can benefit from an ultraviolet absorbing polymer matrix of the claimed composition. Other fluorescent articles intended for long term outdoor use and provided with such a U.V.-absorbing polymer matrix are also intended to be within the scope of the invention. The invention also is not limited to the particular materials disclosed herein. Those skilled in the art will recognize that there are many polyarylate materials other than the specific materials disclosed herein that may be suitable for use in the instant invention. Some such materials may have backbone moiety structures which differ slightly from the backbone moiety structures disclosed herein. For purposes of the instant invention, what is important is that the polymer material comprise a polymer which either is, or is capable of undergoing rearrangement into, a U.V. light absorbing polymer material. Further, while the polymeric resins discussed herein have been thermoplastic resins, certain thermoset resins may also find utility in structures embodying the U.V. light absorbing polymer matrix of the instant invention. Similarly, other fluorescent dyes, U.V. light absorbers, and HALS compounds can also be used.

We claim:

1. An article comprising a fluorescent dye in a polymeric resin matrix, the polymeric resin matrix comprising at least one polymeric resin, or mixture thereof, selected from the group consisting of:
   (i) polymers having a polymeric backbone comprising the following repeating moiety A;

A wherein R is a non-interfering substituent and P is the remainder of the polymer; and whereby the polymers are able to absorb ultraviolet light; and
   (ii) having a polymeric backbone comprising the following repeating moiety B:

B where R is a noninterfering substituent and P is the remainder of the polymer; said moiety B being transformable to said moiety A by photo-Fries rearrangement, whereby said polymer comprising moiety B can be transformed to an ultraviolet light absorbing polymer comprising moiety A.

2. The article of claim 1 wherein the polymeric resin comprises a polyarylate.

3. The article of claim 2 wherein the polyarylate comprises one or both of the following repeating structures I and II:

I

II

4. The article of claim 1 wherein the polymeric resin comprises a blend of polyarylate and at least one additional polymer.

5. The article of claim 4 wherein said additional polymer is selected from the group consisting of polycarbonate, poly(ethylene terephthalate), poly(cyclohexanedimethanol terephthalate), and poly(cyclohexanedimethanol-co-ethylene terephthalate).

6. The article of claim 4 wherein the additional polymer comprises poly(ethylene terephthalate).

7. The article of claim 4 wherein said additional polymer comprises polycarbonate.

8. The article of claim 1 wherein said at least one polymer resin comprises a block copolyestercarbonate having arylate blocks and carbonate blocks.

9. The article of claim 8 wherein the block copolyestercarbonate comprises one or both of the following repeating units:

(III)

(IV)

wherein each $R^1$ is independently H or $C_1$–$C_{12}$ alkyl, p is 0–3, each $R^2$ is independently a divalent organic radical; m is about 2–200; and n is about 30–150.

10. The article of claim 1 in the form of a retroreflective sheeting material.

11. The article of claim 1 wherein the fluorescent dye comprises a dye selected from the group consisting of perylene dyes, perylene ester dyes, perylene imide dyes, thioxanthone dyes, thioindigoid dyes, thioxanthene dyes, benzoxanthene dyes, benzothiazine dyes, naphthalimide dyes, coumarin dyes, and mixtures thereof.

12. The article of claim 11 wherein the fluorescent dye comprises a thioxanthene dye.

13. The article of claim 12 wherein the thioxanthene dye comprises Solvent Yellow 98.

14. The article of claim 11 wherein the fluorescent dye comprises a perylene, perylene imide, or perylene ester dye.

15. The article of claim 14 wherein the fluorescent dye comprises any one or more of Lumogen F Yellow 083, Lumogen F Yellow 240, and Lumogen F Red 300.

16. The article of claim 11 wherein the fluorescent dye comprises a benzoxanthene dye.

17. The article of claim 11 wherein the fluorescents dye comprises a benzothiazine dye.

18. The article of claim 1 wherein said polymeric resin matrix further comprises one or more additives selected from the group consisting of U.V. light absorbing additives and hindered amine light stabilizing additives, said one or more additives being present as an admixture in said polymeric resin matrix.

19. The article of claim 1 further comprising a plurality of retroreflective elements selected from the group consisting of microprismatic cube corners and glass microspheres.

20. The article of claim 19 wherein said retroreflective elements are microprismatic cube corners.

21. The article of claim 1 in the form of a fluorescent retroreflective sheeting material comprising:
a fluorescent layer comprising said polymeric matrix comprising a polyarylate and a fluorescent dye admixed therein; and
a plurality of retroreflective elements.

22. The sheeting material of claim 21 wherein the polyarylate comprises one or both of the following repeating units (I) and (II):

23. The sheeting material of claim 21 wherein said polymeric resin comprises a blend of polycarbonate and polyarylate.

24. The sheeting material of claim 21 wherein said polymeric resin comprises a blend of poly(ethylene terephthalate) and polyarylate.

25. The sheeting material of claim 21 wherein the fluorescent dye is selected from the group consisting of perylene dyes, perylene ester dyes, perylene imide dyes, thioxanthone dyes, thioindigoid dyes, thioxanthene dyes, benzoxanthene dyes, benzothiazine dyes, naphthalimide dyes, coumarin dyes, and mixtures thereof.

26. The sheeting material of claim 21 wherein said retroreflective elements arc microprismatic cube corners on a surface of said fluorescent layer.

27. The sheeting material of claim 21 further comprising a second layer or a light transmissive polymeric material, with the fluorescent layer being disposed in laminar configuration over one surface of said second layer and said retroreflective elements being microprismatic cube corners on the opposite surface of said second layer.

28. The sheeting material of claim 21 wherein said retroreflective elements comprise glass microspheres in an enclosed lens configuration.

29. The sheeting material of claim 21 wherein said retroreflective elements comprise glass microspheres in an encapsulated lens configuration.

30. The sheeting material of claim 21 further comprising a capping film or overlaminate film disposed in laminar configuration over said fluorescent layer.

31. The article of claim 1 wherein said polymeric resin absorbs substantial amounts of light in a substantial portion of the light spectrum between about 290–410 nm.

32. An article comprising a fluorescent dye in a polymeric resin matrix, the polymeric resin matrix comprising at least one polymer, or a mixture thereof, which either is, or is capable of undergoing rearrangement into, a U.V. light absorbing polymer material.

33. The article of claim 32 wherein said at least one polymer is a polyarylate.

* * * * *

UNITED STATES PATENT AND TRADEMARK OFFICE
CERTIFICATE OF CORRECTION

PATENT NO. : 6,972,147 B1
DATED : December 6, 2005
INVENTOR(S) : Wei et al.

It is certified that error appears in the above-identified patent and that said Letters Patent is hereby corrected as shown below:

Column 18,
Line 2, replace "layer or a light" with -- layer of a light --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,972,147 B1  Page 1 of 1
APPLICATION NO. : 09/710510
DATED : December 6, 2005
INVENTOR(S) : Wei et al.

It is certified that error appears in the above-identified patent and that said Letters Patent is hereby corrected as shown below:

Column 18:
Claim 27, Ln. 2, replace "layer or a light" with --layer of a light--.

Signed and Sealed this

Nineteenth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 6,972,147 B1
APPLICATION NO. : 09/710510
DATED : December 6, 2005
INVENTOR(S) : Wei et al.

It is certified that error appears in the above-identified patent and that said Letters Patent is hereby corrected as shown below:

Column 18:
Claim 27, Ln. 41, replace "layer or a light" with --layer of a light--.

This certificate supersedes the Certificates of Correction issued February 7, 2006 and February 19, 2008.

Signed and Sealed this

Eleventh Day of March, 2008

JON W. DUDAS
*Director of the United States Patent and Trademark Office*